United States Patent [19]

Janssen et al.

[11] Patent Number: 5,805,264
[45] Date of Patent: Sep. 8, 1998

[54] PROCESS FOR GRAFT POLYMERIZATION ON SURFACES OF PREFORMED SUBSTATES TO MODIFY SURFACE PROPERTIES

[75] Inventors: Robert A. Janssen, Alpharetta; Ellen M. Ajello, Decatur; Richard D. Auten, Cumming; Glenn S. Nomura, Altanta; Thomas E. Shank, Duluth, all of Ga.

[73] Assignee: CIBA Vision Corporation, Duluth, Ga.

[21] Appl. No.: 187,776

[22] Filed: Jan. 26, 1994

Related U.S. Application Data

[63] Continuation-in-part of Ser. No. 168,726, Dec. 16, 1993, abandoned, which is a continuation-in-part of Ser. No. 42,753, Apr. 6, 1993, abandoned, which is a continuation of Ser. No. 895,964, Jun. 9, 1992, abandoned.

[51] Int. Cl.$^6$ .............................. G02C 7/02; G02C 7/04; C08F 283/00
[52] U.S. Cl. .................... 351/160 R; 351/166; 523/106; 523/108; 525/479; 525/937
[58] Field of Search .................................. 525/479, 937; 523/106, 108; 351/160 R, 166

[56] References Cited

U.S. PATENT DOCUMENTS

| | | | |
|---|---|---|---|
| 3,008,920 | 11/1961 | Urchick | 260/45.5 |
| 3,070,573 | 12/1962 | Beck | 260/45.5 |
| 3,854,982 | 12/1974 | Aelion | 117/68 |
| 4,311,573 | 1/1982 | Mayhan et al. | 204/159.15 |
| 4,468,229 | 8/1984 | Su | 8/507 |
| 4,553,975 | 11/1985 | Su | 8/507 |
| 4,559,059 | 12/1985 | Su | 9/507 |
| 4,589,964 | 5/1986 | Mayhan et al. | 522/85 |
| 4,664,936 | 5/1987 | Ueno et al. | 427/38 |
| 4,752,426 | 6/1988 | Cho | 264/22 |
| 4,761,436 | 8/1988 | Kohno | 522/114 |
| 4,968,532 | 11/1990 | Janssen et al. | 427/164 |
| 5,028,332 | 7/1991 | Ohnishi | 210/500.34 |

FOREIGN PATENT DOCUMENTS

| | | | |
|---|---|---|---|
| 0220919A2 | 6/1987 | European Pat. Off. | G02B 1/04 |
| 0311197A2 | 12/1989 | European Pat. Off. | D06M 10/00 |
| 0378511 | 7/1990 | European Pat. Off. | C08J 7/16 |

OTHER PUBLICATIONS

Patent Abstracts of Japan, vol. 10, No. 262 (C–371) (2318), 6th Sep. 1986; & JP–A–61 089 236 (Kurray Co. Ltd) Jul. 5, 1986 *Whole Abstract*.

Patent Abstracts of Japan, vol. 13, No. 3 (C–557) (3351), 6th, Jan. 1989; & JP–A–63 215 737 (Asahi Chem. Ind. Co.) Aug. 8, 1988 *Whole Abstract*.

Patents Abstracts of Japan, vol. 15, No. 44 (P–1161)4 Feb. 1991 & JP–A–22 78 224 (Seiko Epson Corp.) 14 Nov. 1990.

*Primary Examiner*—Randy Gulakowski
*Attorney, Agent, or Firm*—R. Scott Meece; Michael U. Lee

[57] ABSTRACT

The invention relates to a process for modifying the surface characteristics of a preformed polymer substrate to impart altered properties thereto by graft polymerization on the substrate which includes: placing the polymer substrate in a plasma to form free radicals on the substrate; contacting the substrate having free radicals with oxygen to form hydroperoxy groups on the surface of the substrate; and graft polymerizing an ethylenically unsaturated monomer onto the surface of the polymer substrate.

26 Claims, No Drawings

PROCESS FOR GRAFT POLYMERIZATION ON SURFACES OF PREFORMED SUBSTATES TO MODIFY SURFACE PROPERTIES

This application is a continuation-in-part of application Ser. No. 08/168,726, filed Dec. 16, 1993 now abandoned, which is a continuation-in-part of application Ser. No. 08/042,753, filed Apr. 6, 1993, now abandoned, which is a continuation of Ser. No. 07/895,964, filed Jun. 9, 1992, now abandoned.

This invention is to a process for modifying the surfaces of preformed polymer substrates by the controlled graft polymerization thereon of selected ethylencially unsaturated monomers and to products made by said process.

BACKGROUND OF THE INVENTION

Graft polymerization per se has long been known in the art with many graft copolymers such as ABS (acrylonitrile butadiene/styrene) resins achieving considerable commercial success.

It has also been known in the art that various vinylic monomers can be graft polymerized onto polymer substrates which have been first treated with ionizing radiation in the presence of oxygen or with ozone to form peroxy groups on the surface of said substrate. U.S. Pat. Nos. 3,008,920 and 3,070,573 teach the grafting of selected monomers onto ozonated polymer substrates.

While such a process would in theory seem to be a panacean method to modify at will the surface characteristics of any polymer substrate, such is not the case as is seen in the teachings of U.S. Pat. Nos. 4,311,573 and 4,589,964.

The objective of such graft polymerization is to modify the surface of the polymer substrate without causing major changes in the physical characteristics of the substrate as a whole.

Problems have also arisen when such a graft polymerization process is carried out. One serious complication involves graft polymerization of the vinylic monomer onto the substrate as desired, but with the simultaneous and undesired homopolymerization of the vinylic monomer. This problem can be minimized by carrying out the graft polymerization process in the presence of a metal redox system using a variable valence metal ion in the reduced state to convert any hydroxyl free radical present to hydroxyl ion and thus minimize the simultaneous homopolymerization problem. See U.S. Pat. Nos. 3,008,920, 4,311, 573 and 4,589,964.

U.S. Pat. Nos. 4,311,573 and 4,589,964 teach that another problem encountered in the surface grafting of a preformed polymeric substrate concerns depth and density control of the graft. If the bulk properties of the substrate are to be retained, then the graft depth should be no greater than necessary to modify the surface characteristics of the article. Grafts of excessive depth, grafts of insufficient density to achieve the desired property modification and the swelling and degradation of the substrate article during the process are serious problems plaguing this panacean process.

U.S. Pat. Nos. 4,311,573 and 4,589,964 teach a method aimed at inhibiting homopolymerization, at controlling graft depth and at accelerating graft polymerization to increase graft density, namely by carrying out the graft polymerization in the presence of a variable metal ion (ferrous) and a complexing agent (squaric acid) to control mobility of said ions.

U.S. Pat. No. 4,968,532 discloses a process of modifying the surface characteristics of a preformed polymeric substrate to impart hydrophilicity, hydrophobicity or other desired properties thereto which includes peroxidizing and hydroperoxidizing the surface of the preformed substrate using ozone and directing the subsequent graft polymerization of selected ethylenically unsaturated monomers to the surface of the substrate to achieve the desired alteration of substrate surface characteristics while maintaining substrate structural integrity. The hydroperoxides are, however, generated not only at the surface of the polymeric structure but also at the interior portion of the material. While such penetration may be perfectly suited for most intended uses, in some instances, such as extremely thin films and membranes, the presence of interior hydroperoxides can cause material discoloring and distortion upon subsequent graft polymerization. For those instances, a process for generating hydroperoxides strictly to the surface of the substrate is needed.

BRIEF DESCRIPTION OF THE INVENTION

One object of this invention is to provide a facile process for modifying the surface characteristics of a preformed polymeric substrate to impart desired properties thereto.

Another object of this invention is to generate hydroperoxides on the surface of a substrate with minimum penetration to the substrate interior.

The present invention relates to a process for modifying the surface characteristics of a preformed polymer substrate to impart altered properties thereto by graft polymerization on the substrate. The substrate is placed in a plasma, such as Argon or Helium in plasma form, to form free radicals on its outmost surfaces, then contacted with oxygen to form hydroperoxy groups from the free radicals, and graft polymerizing an ethylenically unsaturated monomer onto the surface.

DETAILED DISCLOSURE OF THE INVENTION

The instant invention is to a process for modifying the surface characteristics of a preformed polymer substrate to impart hydrophilicity, hydrophobicity or other desired properties thereto by graft polymerization on the substrate. This is accomplished by placing the polymer substrate in a radical generating plasma to form free radicals on the substrate and contacting the substrate having free radicals with oxygen to form hydroperoxy groups on the surface of the substrate. While it is preferred that the radical generating plasma be Argon in plasma form, other radical generating gases, such as helium or other noble gases in plasma form, may be used. In preliminary steps in the instant process, the polymer substrate can be saturated or swollen with a liquid either before or after being contacted with the radical generating plasma to form the hydroperoxy groups. The hydroperoxy groups may be subsequently activated and graft polymerized onto by an aqueous redox system, such as ferrous ion. The hydroperoxides will be limited to a depth of a few hundred Angstroms, and therefor the integrity of the substrate material will be preserved.

Upon thermal or otherwise induced decomposition, the hydroperoxy groups cleave into two active free radicals. One is attached to the polymer surface and is capable of initiating graft polymerization thereon while the other is a free hydroxyl radical not attached to the surface. This latter free radical is available to initiate homopolymerization of the monomer unless such homopolymerization is inhibited or suppressed.

U.S. Pat. Nos. 3,008,920 and 4,589,964 teach that an effective homopolymerization-inhibiting agent is the cuprous, ferrous or other variable valence metal ion such as those of cobalt, manganese, molybdenum, tin, indium, cerium, chromium, thallium and vanadium. A preferred metal salt providing such metal ion is ferrous ammonium sulfate, although other ferrous salts such as ferrous sulfate, ferrous chloride, ferrous iodide and ferrous bromide can be used as well.

These reduced valence (-ous) salts react with the hydroxyl free radical in a redox system to produce the hydroxyl ion and the oxidized (-ic) salt. With the concentration of hydroxyl free radicals thus minimized or eliminated, there is no initiator for the homopolymerization which is now effectively suppressed.

Since in general the presence of homopolymer unattached to the surface of the substrate leads to high extractables and unstable surface characteristics, a homopolymerization-inhibiting agent is usually present in the graft polymerization step of the instant process.

However, there is one variation of the instant process where crosslinked homopolymerization is an important aspect of providing a method of encapsulating a substrate by an envelope of the homopolymer. In this variation of the instant process, the ethylenically unsaturated monomer is allowed to be initiated, with a reduced ferrous ion concentration, both by the active free radicals attached to the surface of the substrate as well as by the free active hydroxyl free radical present in the system. No or little homopolymerization-inhibiting agent is present in this variation. The entire hydrogel polymer network is covalently bound in a three-dimensional structure through the presence of a crosslinking agent.

The encapsulation of materials with a protective coating which can be removed in a controlled fashion, as by weathering or by exposure to a period in the soil, is a utility for products made by this process variation. Protective coatings for seeds is contemplated.

It is known that the use of variable valence metal ions, for example ferrous or cuprous, can inhibit homopolymerization during graft polymerization of a substrate containing hydroperoxy groups. However, while the ferrous ion inhibits homopolymerization, there is a limitation in its use since such ions subsequently penetrate into the polymeric substrate allowing for the desired graft polymerization to occur at an undesired spot, namely in the interior of the substrate.

The effect of this graft polymerization at the wrong place is a distortion of the substrate with a concomitant loss in physical properties and dimensional stability and integrity. Such distortion is generally undesirable for obvious reasons and in the contact lens field is intolerable. However, with the generation of hydroperoxy groups by a plasma, this problem is eliminated. This is because the chemical conversion is strictly limited to only a depth of several hundred Angstroms.

Another aspect of the instant invention is the ability to create a soft polymer skirt around the periphery of a rigid polymer contact lens. Current technology to prepare such modified lenses is complex, laborious and prohibitively uneconomic.

The instant process, however, affords a facile route for the production of such modified lenses. Following the formation of hydroperoxy groups on the lens substrate, the lens is placed in a mold where the center of the lens is covered and where the periphery of said lens is exposed to an aqueous grafting solution containing a hydrophilic monomer and crosslinking agent. The grafting solution will contain an appropriate mixture of hydrophilic and crosslinking monomers to impart the desired properties required for the soft polymer skirt of the contact lens to give the rigid contact lens greatly improved eye comfort and other ancillary benefits not normally associated with rigid contact lenses.

The filled mold containing the appropriate grafting monomers is exposed to UV light. This irradiation decomposes the hydroperoxy groups present on the peripheral portion of the lens to initiate graft and crosslinked copolymerization of the monomer mixture in the mold to form a soft polymer skirt of desired properties firmly bonded via the grafts to the periphery of the rigid contact lens.

The preformed polymeric substrate which can be used in this process can be any fabricated polymeric product such as a film, fiber, pellicle, device or object including contact lenses whose surface characteristics are in need of modifying in some fashion to impart hydrophilicity, hydrophobicity, dyeability (tinting), spacity, diffraction differences, wettability, bonding characteristics, oxygen permeability, bactericidal properties, lubricity, and the like.

The only requirement is that the polymer from which the fabricated product is made must itself have a hydrocarbon group somewhere in its structure making it amenable to hydroperoxidation when exposed to the radical generating plasma to form hydroperoxy groups on the preformed polymeric substrate surface.

Polymeric materials useful in this instant invention include inter alia polyolefins, polyesters such as poly (hydroxyethl methacrylate) or poly (HEMA), polyamides, cellulosics, polyurethanes, non-silicone hydrogels, hydrophilic polysiloxanes, hydrophobic polysiloxanes, polymers containing poly(alkylene oxide) units, polycarbonates, silicone rubber, natural and synthetic rubber, epoxy resins, polyvinyl chloride, polystyrene, poly(methyl methacrylate), fluorocarbon-containing ploymers, and copolymers and the like.

The hydroperoxy groups are conveniently introduced onto the surface of the preformed polymeric substrate by subjecting the substrate to a radical generating plasma, including noble gases, such as Argon or Helium. This can be done by appropriately suspending, placing or otherwise fixing the preformed substrate in a chamber or vessel so that the surfaces to be modified will be intimately contacted with the plasma and then followed by exposure to diatomic oxygen. The residual radicals on the substrate will then react with the oxygen to result in a peroxy radical which then, by hydrogen abstraction, will ultimately produce a hydroperoxide. Generally the time required is less than one hour, usually about 30 minutes.

The reaction temperature is generally not critical, and the reaction can be conducted over a wide temperature range from between 0° and 100° C. For convenience ambient temperatures are preferred.

Since the substrate contains hydroperoxy groups which are unstable when raised to elevated temperatures, the substrate can be kept for long periods of time (several months) at low temperatures (0° to 20° C.) without loss of the peroxy and hydroperoxy groups.

In order to prevent undesired changes in overall polymer properties involving the basic integrity of the substrate itself, it is desirable to prevent or at least to minimize any subsequent grafting of the modifying monomer by graft polymerization anywhere on the preformed polymer substrate except on the surface of said substrate.

Generally, it requires only a relatively small amount of material (by weight) to be actually grafted onto the surface of a polymer substrate to achieve the desired modification in the substrate surface properties. The grafting may be followed by dying the lens, such as set forth in U.S. Pat. Nos. 4,468,229, 4,553,975 and 4,559,059, all to Su, and incorporated herein by reference.

The graft polymerization is generally carried out using an aqueous solution of an ethylenically unsaturated monomer or mixture of monomers capable to undergoing graft addition polymerization onto the surface of the substrate. In those cases where the monomer is not appreciably soluble in water, a cosolvent, preferably tert-butyl alcohol, is used to enhance the solubility of the monomer in the aqueous graft polymerization system. Additionally where indicated, the graft polymerization can be carried out in the presence of actinic radiation with or without the presence of a photoinitiator.

The choice of the monomer or monomers depends on the nature of the substrate and on the particular surface modification desired. Thus the monomers may be hydrophilic, hydrophobic, crosslinking agents, dyesites, bactericidal or with any of a wide gamut of properties as required to achieve the modification desired.

Further, the grafting solution may consist of ethylenically unsaturated monomers, oligomers, polymer, or mixtures thereof, in which each grafting unit possesses a specific desirable property may be imparted to a contact lens by surface modification. For example, the finished lens surface may have improvements in both antimicrobial properties and either hydrophilicity or hydrophobicity; improvements in both biocompatibility and either hydrophobicity or hydrophilicity; improvements in biocompatibility and antimicrobial properties; and so on.

Suitable hydrophilic monomers include generally water soluble conventional vinyl monomers such as:

acrylates and methacrylates of the general structure

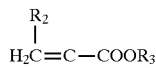

where $R_2$ is hydrogen or methyl and $R_3$ is hydrogen or is an aliphatic hydrocarbon group of up to about 10 carbon atoms substituted by one or more water solubilizing groups such as carboxy, hydroxy, amino, lower alkylamino, lower dialkylamino, a polyethylene oxide group with from 2 to about 100 repeating units, or substituted by one or more sulfate, phosphate, sulfonate, phosphonate, carboxamido, sulfonamido or phosphonamido groups, or mixtures thereof;

preferably $R_3$ is an oligomer or polymer such as polyethylene glycol, polypropylene glycol, poly(ethylenepropylene) glycol, poly(hydroxyethl methacrylate), poly(dimethyl acrylamide), poly(acrylic acid), poly(methacrylic acid), pllysulfone, poly(vinyl alcohol), polyacrylamide, poly(acrylamide-acrylic acid), poly(styrene sulfonate) sodium salt, poly(ethylene oxide), poly(ethylene oxide-propylene oxide), poly(glycolic acid), poly(lactic acid), poly(vinylpyrrolidone), cellulosics, polysaccharides, mixtures thereof, and copolymers thereof;

acrylamides and methacrylamides of the formula

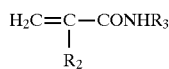

where $R_2$ and $R_3$ are as defined above;

acrylamides and methacrylamides of the formula

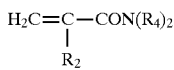

where $R_4$ is lower alkyl of 1 to 3 carbon atoms and $R_2$ is as defined above;

maleates and fumarates of the formula

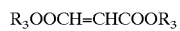

wherein $R_3$ is as defined above;

vinyl ethers of the formula

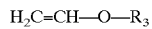

where $R_3$ is as defined above;

aliphatic vinyl compounds of the formula

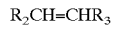

where $R_2$ is as defined above and $R_3$ is as defined above with the proviso that $R_3$ is other than hydrogen; and vinyl substituted heterocycles, such as vinyl pyridines, piperidines and imidazoles and N-vinyl lactams, such as N-vinyl-2-pyrrolidone.

The use of an oligomer or polymer as the $R_3$ unit of the monomer has the advantage of minimizing the penetration of the monomer into the matrix structure of the contact lens. In contrast, a lower molecular weight monomer, such as dimethyl acrylamide, may penetrate the lens to an appreciable extent under the proper conditions. This penetration by the monomer, and subsequent polymerization, may cause the lens to swell or become optically distorted. Thus, the higher molecular weight $R_3$ units, i.e., the oligomers and polymers disclosed above, are preferred since these species will not penetrate as readily as the monomers having low molecular weight $R_3$ units because of the size and bulk of the oligomer or polymer.

On the other hand, very high molecular weight $R_3$ units are not preferred because of the high resultant viscosity when in solution. Excessively high viscosity may lead to processing difficulties. Accordingly, a preferred group of $R_3$ units has a molecular weight of about 200 to about 10,000, more preferably from about 200 to about 5000, and most preferably about 500 to about 5000.

The oligomer or ploymer $R_3$ units may have one or more vinyl groups per chain, depending upon the specific properties desired. Multifunctional units may produce more densely crosslinked surface grafts, thereby resulting in improved abrasion resistance and improved biocompatibility. In addition, crosslinking may decrease penetration into the contact lens, thereby minimizing lens swelling and optical distortion. Therefore, in one embodiment, multifunctional oligomers and polymers are preferred for the $R_3$ group.

Included among the useful water soluble monomers are: 2-hydroxyethyl-; 2- and 3-hydroxypropyl-; 2,3-dihydroxypropyl-; polyethoxyethyl-; and polyethoxypropylacrylates, methacrylates, acrylamides and methacrylamides; acrylamide, methacrylamide, N-methylacrylamide, N-methylmethacrylamide, N,N-dimethylacrylamide, N,N-dimethylmethacrylamide; N,N-dimethyl- and N,N-diethyl-aminoethyl acrylate and methacrylate and the corresponding acrylamides and methacrylamides; 2- and 4-vinylpyridine; 4- and 2-methyl-5-vinylpyridine; N-methyl-4-vinylpiperidine; 2-methyl-1- vinylimidazole; N,N-dimethylallylamine; dimethylaminoethyl vinyl ether; N-vinylpyrrolidone; acrylic and methacrylic acid; itaconic, crotonic, fumaric and maleic acids and the lower hydroxyalkyl mono and diesters thereof, such as the 2-hydroxyethyl fumarate and maleate, sodium acrylate and methacrylate; maleic anhydride; 2-methacryloyloxyethylsulfonic acid and allylsulfonic acid.

Preferred water soluble monomers include 2-hydroxyethyl methacrylate; N,N-dimethylacrylamide; acrylic acid and methacrylic acid; and most preferably 2-hydroxyethyl methacrylate.

Suitable hydrophobic copolymerizable monomers include water insoluble conventional vinyl monomers such as:

acrylates and methacrylates of the general formula

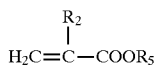

where $R_2$ is as defined above and $R_5$ is a straight chain or branched aliphatic, cycloaliphatic or aromatic group having up to 20 carbon atoms which is unsubstituted or substituted by one or more alkoxy, alkanoyloxy or alkyl of up to 12 carbon atoms, or by halo, especially chloro or preferably fluoro, or $C_3$–$C_5$ polyalkyleneoxy of 2 to about 100 units preferably $R_3$ is an oligomer or ploymer such as polyethylene, polypropylene, poly(methyl methacrylate), poly(ethyl methacrylate), poly(glycidyl methacrylate), mixtures thereof, and copolymers thereof;

acrylamides and methacylamides of the general formula

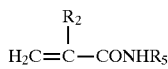

where $R_2$ and $R_5$ are defined above;

vinyl ethers of the formula

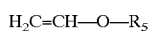

where $R_5$ is as defined above;

vinyl esters of the formula

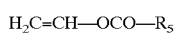

where $R_5$ is as defined above;

maleates and fumarates of the formula

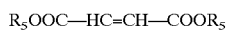

where $R_5$ is as defined above;

and vinylic substituted hydrocarbons of the formula

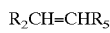

where $R_2$ and $R_5$ are as defined above.

The reasoning behind using oligomer or polymer groups in the hydrophobic monomer is analogous to the reasoning for use in the hydrophilic monomer. The use of an oligomer or polymer as the $R_5$ unit of the monomer has the advantage of minimizing the penetration of the monomer into the matrix structure of the contact lens. In contrast, a lower molecular weight monomer may penetrate the lens to an appreciable extent under the proper conditions. This penetration by the monomer, and subsequent polymerization, may cause the lens to swell or become optically distorted. Thus, the higher molecular weight $R_5$ units, i.e., the oligomers and polymers disclosed above, are preferred since these species will not penetrate as readily as the monomers having low molecular weight $R_5$ units because of the size and bulk of the oligomer or polymer.

On the other hand, very high molecular weight $R_5$ units are not preferred because of the high resultant viscosity when in solution. Excessively high viscosity may lead to processing difficulties. Accordingly, a preferred group of $R_3$ units has a molecular weight greater than about 200 to about 10,000, more preferably from about 200 to about 5000, and most preferably about 500 to about 5000.

The oligomer or polymer $R_5$ units may have one or more vinyl groups per chain, depending upon the specific properties desired. Multifunctional units may produce more densely crosslinked surface grafts, thereby resulting in improved abrasion resistance and improved biocompatibility. In addition, crosslinking may decrease penetration into the contact lens, thereby minimizing lens swelling and optical distortion. Therefore, in one embodiment, multifunctional oligomers and polymers are preferred for the $R_5$ group.

Useful hydrophobic monomers include, for example:
methyl, ethyl, propyl, isopropyl, butyl, ethoxyethyl, methoxyethyl, ethoxypropyl, phenyl, benzyl, cyclohexyl, hexafluoroisopropyl or n-octyl-acrylates and -methacrylates as well as the corresponding acrylamides and methacrylamides; dimethyl fumarate, dimethyl maleate, diethyl fumarate, methyl vinyl ether, ethoxyethyl vinyl ether, vinyl acetate, vinyl propionate, vinyl benzoate, acrylonitrile, styrene, alpha-methylstyrene, 1-hexene, vinyl chloride, vinyl methyl ketone, vinyl stearate, 2-hexene and 2-ethylhexyl methacrylate.

Suitable cross-linking agents are di- or polyethylenically unsaturated monomers such as acrylates and methacrylates, acrylamides and methacrylamides, vinylethers, styrene, fumarate, and itaconate or allyl. Typical representatives include the diacrylates and dimethylacrylates of 1,2-ethylene glycol, of 1,2- and 1,3-propanediol and of 1,3- and 1,4-butane-, 1,5-pentane- and 1,6-hexanediol; the diacrylates and dimethacrylates of diethylene-, triethylene- and tetraethylene glycol, and of neopentyl glycol, di-(2-hydroxyethyl) sulfone and thiodiethylene glycol; trimethylolpropane triacrylate and trimethacrylate, di-trimethylolpropane, tetraacrylate, pentaerythritol tetraacrylate, and tetramethacrylate, di-pentaerythritol monohydroxy pentaacrylate, bisphenol-A- and ethoxylated bisphenol-A-dimethacrylate, tris(2-hydroxyethyl)-isocyanurate triacrylate; allyl acrylate and methacrylate; diallyl phthalate and triallyl melamine; and methylene-bisacrylamide, ethylene-bismethacrylamide, divinylbenzene, bivinyltoluene, divinyl sulfone, divinylether, and butanediol divinylether. Also useful are reaction products of equivalent amounts of aliphatic, cycloaliphatic and aromatic diisocyanates, or of vinyl-unsaturated isocyanates with hydroxy or amino substituted acrylates and methacrylates, such as the reaction products of hexamethylene-1,6-diisocyanate, 3,3,4(4,4,3)-trimethylhexane-1,6-diisocyanate, 4,4'-diisocyanato-diphenylmethane or isophorone diisocyanate with two moles of 2-hydroxyethyl- or N-t-butyl-2-aminoethyl acrylate or methacrylate, 3-hydroxypropyl methacrylamide, or of one mole of 2-isocyanatoethyl methacrylate with one mole hydroxyethyl- or N-t-butyl-2-aminoethyl acrylate or methacrylate, or 3-hydroxypropyl methacrylamide. Also useful are silicone-containing diacrylates and dimethacrylates, such as bis(-3-methacryloxypropyl)-tetramethyl disiloxane and bis(-3-methacryloxypropyl)-tetra(trimethylsiloxy) disiloxane, and fluorinated compounds such as 2-(1-thia-2,2,3,3-tetrahydro)-tridecafluorononyl butane-1, 4-diol di(meth)acrylate.

These cross-linking agents can typically be present in amounts from about 0.01 to about 20 weight percent, preferably in amounts from about 0.1% to about 10% by weight, and more preferably in amounts of about 0.5% to 7% by weight.

The following examples are presented for the purpose of illustration only and are not to be construed to limit the nature or scope of the instant invention in any manner whatsoever.

EXAMPLE 1

Grafting onto Hydrophobic Silicone

Four silicone contact lenses which, in the hydrated condition, contained less than 0.5 percent water of hydration were dried in vacuum oven and weighed. Three lenses were plasma treated using Argon gas with conditions of 90 seconds reaction time at 10 watts of power. The fourth lens was used as a control. The lenses were then exposed to diatomic oxygen for five minutes after the Argon plasma. After the oxygen treatment, the lenses were placed in water with a nitrogen purge for one hour. Three solutions were made for grafting and set at 34° Celsius. The solutions were as follows:

1) 10 Percent Dimethylacrylamide 3.0 grams dimethylacrylamide +27.0 grams water +0.075 grams ferrous ammonium sulfate hexahydrate.
2) 20 Percent Dimethylacrylamide 6.0 grams dimethylacrylamide +24.0 grams water +0.075 grams ferrous ammonium sulfate hexahydrate.
3) 50 percent Dimethylacrylamide 15.0 grams dimethylacrylamide +15.0 grams water +0.075 grams ferrous ammonium sulfate hexahydrate.

The lenses were put into the respective solutions, with a continuous nitrogen purge, and left to react for approximately 20 hours. After the lenses had grafted, they were placed into water and extracted for approximately 24 hours. The lenses were dried in a vacuum oven including the control for approximately 24 hours and weighed until a stable weight was obtained. The following is the data of the gravimetric determination of poly-dimethyl acrylamide on silicone lenses:

| Dimethylacrylamide Concentration | Graft Weight/Area |
| --- | --- |
| Control | $0.09 \times 10^{-4}$ mg/mm$^2$ |
| 10 percent | $5.9 \times 10^{-4}$ mg/mm$^2$ |
| 20 percent | $36.7 \times 10^{-4}$ mg/mm$^2$ |
| 50 percent | $103 \times 10^{-4}$ mg/mm$^2$ |

As can be seen there is a weight increase in the lens after being placed in the grafting solutrion. This graft weight of the polydimethlacrylamide is in proportion to the concentration of dimethylacrylamide in the grafting solution.

EXAMPLE 2

Vinyl Sulfone Tinting onto Grafted Silicone

A hydrophilic silicone contact lens was placed in a plasma generator and reacted for 90 seconds at 10 watts of power using Argon gas. After the plasma treatment the lens was exposed to diatomic oxygen for five minutes. The lens was taken and placed in water with nitrogen purge for one hour. The lens was taken and placed in a solution, under a continuous nitrogen purge, at 34° Celsius containing 3.0 grams of 2-hydroxy ethyl methacrylate, 27.0 grams of water, and 0.075 grams ferrous ammonium sulfate hexahydrate. The graft solution was exposed to the lens for 20 hours. After the grafting had taken place as observed by the hydrophilic nature of the lens, the lens grafted with 2-hydroxy ethyl methacrylate was placed in a solution containing 40 milliliters of 1 percent Brilliant Blue Dye Solution and 133 milliliters of 10 percent sodium phosphate tribasic dodecahydrate. The lens was taken out of the solution after one hour. The dye had tinted the lens. Also after water extractions and a one hour water boil, the lens still remained tinted. A non-plasma treated silicone lens was also placed in the dye solution, but the lens remained clear as observed by visual inspection.

EXAMPLE 3

Grafting onto Hydrophilic Silicone

A dried contact lens composed of a copolymer of poly siloxane-polyethyleneglycol, which in the hydrated state contains 47 percent water, was placed in a Argon plasma and left to react for 90 seconds at 10 watts of power. After the plasma treatment, the lens was exposed to diatomic oxygen for five minutes. The lens was placed in a grafting solution, under a continuous nitrogen purge, containing 180 grams water and 20 grams dimethylacrylamide and 0.50 grams ferrous ammonium sulfate hexahydrate and left to react for 18 hours at 34° Celsius. The lens was more lubricous and hydrophilic than the control lens, thus indicating that a graft had occurred on the surface of the treated contact lens.

EXAMPLE 4

Grafting Onto Polyethylene and Polybutadiene-styrene A polyethylene (PE) strip and a poly butadiene-styrene (PBS) strip were placed in a vacuum oven to dry. The strip of polyethylene was plasma treated using Argon gas with conditions of 90 seconds reaction time at 10 watts of power. The PE and PBS were exposed to diatomic oxygen for 5 minutes after the Argon plasma. After the oxygen treatment the strips were placed in water with a nitrogen purge for one hour. A solution for grafting was made with 180 grams of water, 20 grams of dimethyl acrylamide and 0.5 grams of ferrous ammonium sulfate hexahydrate. The strips were put into the grafting solution at 34° Celsius and left to react for approximately 18 hours under a continuous nitrogen purge. The articles were more lubricous and hydrophilic than the control material, thus indicating that a graft had occurred on the surface of the treated material.

EXAMPLE 5

Determination of Hydroperoxide Concentration on Plasma Treated Lenses

Four dried silicone lenses, which normally contain less than 0.5 percent water of hydration, was placed in a plasma generator and reacted for 90 seconds at 10 watts of power using Argon gas. After the plasma treatment the lenses were exposed to diatomic oxygen for five minutes. Hydroperoxide concentration on the lenses were then evaluated by spectrophotometric determination of liberated iodine. Analysis of the plasma treated lenses in conjunction with a blank yielded a hydroperoxide concentration of $3.2 \times 10^{-11}$ moles per mm$^2$ of lens surface area on the plasma treated lenses. Therefore, it should be seen that hydroperoxides have been formed on the surface of the lenses by the use of the Argon plasma treatment in concert with exposure to diatomic oxygen.

EXAMPLE 6

Contact Angle Measurement

Two silicone contact lenses, which in the hydrated state, contain less than 0.5 percent water of hydration, were dried in a vacuum oven. A lens was plasma treated using Argon gas with conditions of 90 seconds reaction time at 10 watts of power. The second lens was used as a control. The lens that was plasma treated was exposed to diatomic oxygen for five minutes after Argon plasma. Then the lens was placed in water with a nitrogen purge for one hour. The lens was then placed in a grafting solution composed of 3.0 grams dimethylacrylamide, 27.0 grams water, and 0.075 grams ferrous ammonium sulfate hexahydrate, and left to react for approximately 20 hours plus extracted in boiling water for one hour. After the lens had grafted, it was placed into water and extracted for approximately 24 hours. The control lens and the grafted lens were measured for contact angle. The control measured 69° and the grafted lens measured 0°.

This example demonstrates that the plasma treatment with the accompanying grafting solution produces a grafted lens surface with enhanced wettability.

EXAMPLE 7

Optimizing Plasma Time

Dried silicon contact lenses, which contained less than 0.5 percent water in the hydrated state, were placed into plasma chamber and treated with a Argon plasma for times ranging from 30 seconds to 4 minutes at 10 watts of power. The lenses were then exposed to diatomic oxygen for 5 minutes after the Argon plasma. After the oxygen treatment, the lenses were placed into water with a $N_2$ purge for one hour. A grafting solution containing ten percent dimethylacrylamide, 90 percent water and 0.25 percent ferrous ammonium sulfate hexahydrate was formulated and the lenses were placed into this grafting solution under a continuous nitrogen purge. Two hours later the lenses were removed and compared. Lenses plasma treated for 90 seconds and grafted for two hours were found to have the optimal graft as observed by surface wettability and lubricity.

EXAMPLE 8

Process for Graft Polymerization on Surfaces of Preformed Substrates to Modify Surface Properties A hydrophilic silicone contact lens was placed in a plasma generator and reacted for 90 seconds at 10 watts of power using Argon gas. After the plasma treatment the lens was exposed to diatomic oxygen for five minutes. The lens was taken and placed in water with nitrogen purge for one hour. The lens was taken and placed in a solution, under a continuous nitrogen purge, at 34° Celsius containing 3.0 grams of 2-hydroxy ethyl methacrylate, 27.0 grams of water, and 0.075 grams ferrous ammonium sulfate hexahydrate. The graft solution was exposed to the lens for 20 hours. After the grafting had taken place as observed by the hydrophilic nature of the lens, the lens grafted 2-hydroxy ethyl methacrylate was placed in a solution containing 40 milliters of 1 percent [2-anthracene-sulfonic acid, 1-amino-9, 10-dihydro-9, 10-dioxo-4-((3-((2-(sulfooxy)ethyl)sulfonyl) phenyl)amino)-,disodium salt], and 133 militers of 10 percent sodium phosphate tribasic dodecahydrate. The alkali converts the sulphato ester into vinyl sulphone by the removal of the weakly basic sulphate ion once a proton is eliminated from the alpha methylene group. The result of this nucleophilic addition reaction is a covalent bond between the carbon carbon double bond of the vinyl sulphone and the oxygen of the hydroxyl group of the 2-hydroxy ethyl methacrylate graft. The tinted lens was removed from the solution after one hour, and extracted in water and a one hour water boil. The lens retained its blue color.

EXAMPLE 9

Grafting Onto Hydrophilic Silicone

In The Presence Of A Cross-linking Agent A dried contact lens composed of a copolymer of polysiloxane-polyethyleneglycol, which in the hydrated state contains 47 percent water, is placed in an Argon plasma and allowed to react for 90 seconds at 10 watts power. After the plasma treatment, the lens is placed in a grafting solution, under a continuous nitrogen purge, containing one gram of methylene-bis acrylamide cros-linking agent, 180 grams water and 20 grams dimethylacrylamide and 0.50 grams ferrous ammonium sulfate hexahydrate. The mixture is allowed to react for about 18 hours at about 34½ C.

EXAMPLE 10

A polyethylene (PE) strip and a poly(butadiene-styrene) (PBS) strip are placed in a vacuum oven to dry. The strip of polyethylene is plasma treated using Argon gas with conditions of 90 seconds reaction time at 10 watts power. The PE and PBS strips are exposed to diatomic oxygen for five minutes after the Argon plasma treatment. After the oxygen treatment, the strips are placed in water with a nitrogen purge for one hour. A solution for grafting is made with 180 grams of water, 20 grams of dimethyl acrylamide, two grams of methylene-bis acrylamide cross-linking agent, and 0.5 grams of ferrous ammonium sulfate hexahydrate. The strips are placed into the grafting solution at 34½ C. and allowed to react for approximately 18 hours under a continuous nitrogen purge.

What is claimed is:

1. A process for modifying the surface characteristics of a preformed ophthalmic lens to impart altered properties thereto by graft polymerization on said lens which comprises:

placing the lens in a plasma to form free radicals on the lens contacting the lens having free radicals with oxygen to form hydroperoxy groups on the surface of the lens; and graft polymerizing an ethylenically unsaturated oligomer or polymer onto the surface of the lens in the presence of a cross-linking agent.

2. The process according to claim 1, wherein the plasma is a noble gas in plasma form.

3. The process according to claim 1, wherein the graft polymerization step is carried out in the presence of a variable valence metal ion to suppress homoploymerization during grafting of the ethylencially unsaturated oligomer or polymer.

4. The process according to claim 1, wherein said oxygen is diatomic oxygen.

5. The process according to claim 2, wherein the plasma is argon in plasma form.

6. The process according to claim 2, wherein the plasma is helium in plasma form.

7. The process of claim 1, further comprising the step of dying the substrate subsequent to said graft polymerizing.

8. The process of claim 7, wherein the dye is covalently bonded to the grafted substrate.

9. A contact lens produced according to the process of claim 1.

10. The process of claim 1, wherein the cross-linking agent is selected from the group consisting of diethylenically unsaturated monomers and polyethylenically unsaturated monomers.

11. The process of claim 10, wherein the cross-linking agent is selected from the group consisting of acrylates, methacrylates, acrylamides, and methacrylamides.

12. The process of claim 11, wherein the cross-linking agent is methylene-bis acrylamide.

13. A process as recited in claim 1, wherein said oligomer or polymer has a molecular weight between about 200 and 100,000.

14. A process as recited in claim, wherein said oligomer or polymer has a molecular weight of about 500 to 5000.

15. A process as recited in claim 13, wherein said oligomer or polymer is hydrophilic and includes a group selected from the group consisting of polyethylene glycol, polypropylene glycol, poly(ethylene-propylene) glycol, poly(hydroxyethyl methacrylate), poly(dimethyl acrylamide), poly(acrylic acid), poly(methacrylic acid), polysulfone, poly(vinyl alcohol), polyacrylamide, poly(acrylamide-acrylic acid), poly(styrene sulfonate) sodium salt, polyethylene oxide, poly(ethylene oxide-propylene oxide), poly(glycolic acid), poly(lactic acid), poly(vinylpyrrolidone), cellulosics, polysaccharides, mixtures thereof, and copolymers thereof.

16. A process as recited in claim 13, wherein said oligomer or polymer is hydrophobic and includes a group selected from the group consisting of polyethylene, polypropylene, poly(methyl methacrylate), poly(ethyl methacrylate), poly(glycidyl methacrylate), mixtures thereof, and copolymers thereof.

17. A contact lens which has been surface treated by a process comprising:
  (a) placing the contact lens in a plasma to form free radicals on the contact lens;
  (b) contacting the contact lens having free radicals with oxygen to form hydroperoxy groups on the surface of the contact lens; and
  (c) graft polymerizing an ethylenically unsaturated oligomer or polymer onto the surface of the contact lens in the presence of a cross-linking agent.

18. A process for modifying the surface characteristics of an ophthalmic lens to impart altered properties thereto by graft polymerization on said lens, which process comprises the steps of:
  (a) placing the lens in a plasma to form free radicals on the lens;
  (b) contacting the lens having free radicals with oxygen to form hydroperoxy groups on the surface of the lens; and
  (c) graft polymerizing an ethylenically unsaturated oligomer or polymer, in the presence of a cross-linking agent, onto the surface of the lens, said oligomer or polymer having a molecular weight between about 200 and 100,000.

19. A process as recited in claim 18, wherein said oligomeric or polymeric chain has a molecular weight of about 500 to 5000.

20. A process as recited in claim 18, wherein said oligomer or polymer is hydrophilic and includes a group selected from the group consisting of polyethylene glycol, polypropylene glycol, poly(ethylene-propylene) glycol, poly(hydroxyethyl methacrylate), poly(dimethyl acrylamide), poly(acrylic acid), poly(methacrylic acid), polysulfone, poly(vinyl alcohol), polyacrylamide, poly(acrylamide-acrylic acid), poly(styrene sulfonate) sodium salt, polyethylene oxide, poly(ethylene oxide-propylene oxide), poly(glycolic acid), poly(lactic acid), poly(vinylpyrrolidone), cellulosics, polysaccharides, mixtures thereof, and copolymers thereof.

21. A process as recited in claim 18, wherein said oligomer or polymer is hydrophobic and includes a group selected from the group consisting of polyethylene, polypropylene, poly(methyl methacrylate), poly(ethyl methacrylate), poly(glycidyl methacrylate), mixtures thereof, and copolymers thereof.

22. A process as recited in claim 18, wherein said graft polymerization is accomplished in the presence of a crosslinking agent.

23. A process as recited in claim 18, wherein said step of graft polymerizing involves the graft polymerizing of at least two different monomers.

24. A process as recited in claim 23, wherein one monomer imparts improved hydrophilic properties to the lens and another monomer imparts improved biocompatibility to the lens.

25. A process as recited in claim 23, wherein one monomer imparts improved hydrophilic properties to the lens and another monomer imparts improved antimicrobial properties to the lens.

26. A process as recited in claim 18, wherein said monomer is polyfunctional.

* * * * *